March 12, 1940.  D. P. HYNES  2,193,134
HOOD LATCH
Original Filed July 11, 1938  2 Sheets-Sheet 1
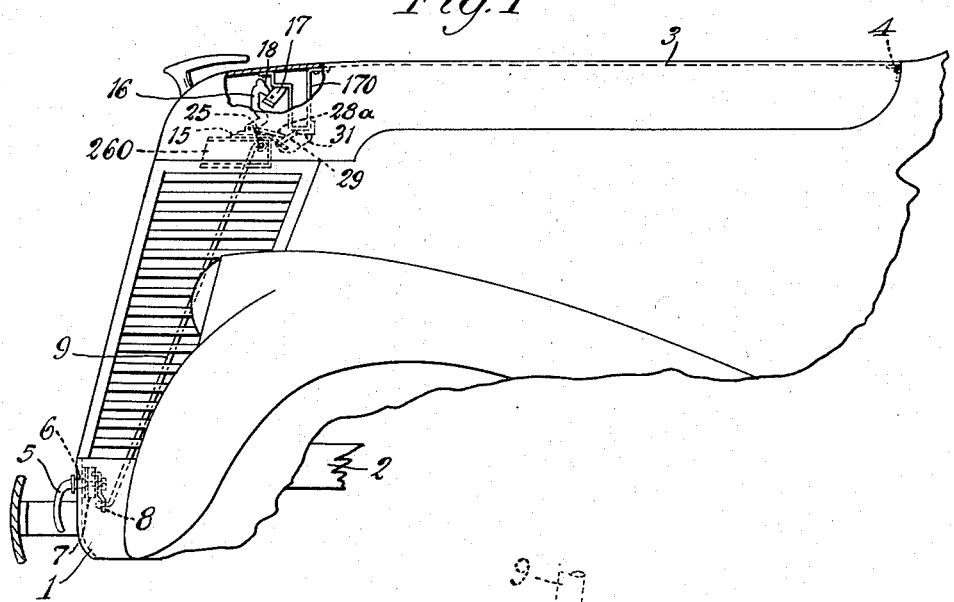
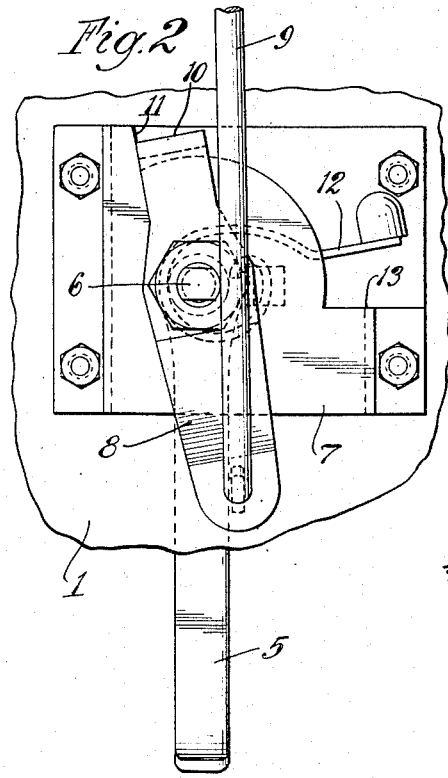
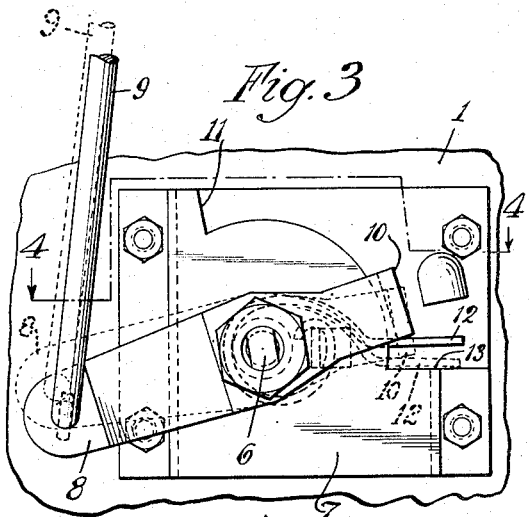
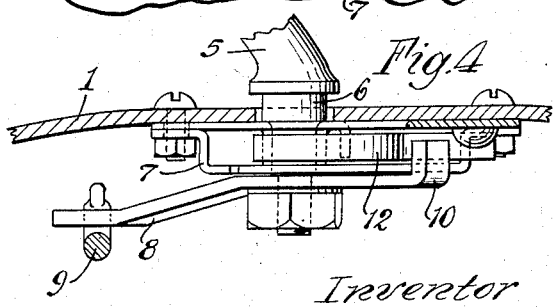
Inventor
Dibrell P. Hynes
by Parker  Carter
Attorneys.

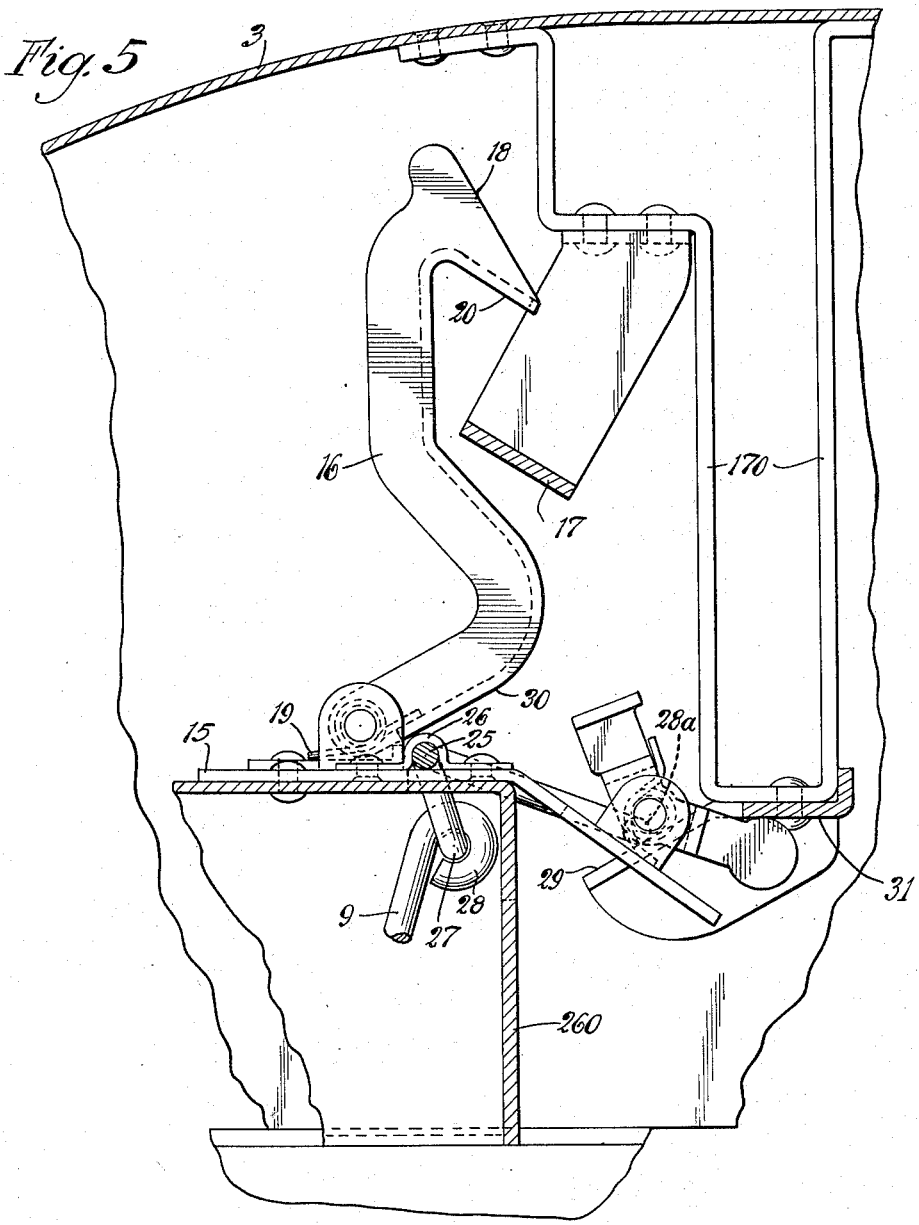

Patented Mar. 12, 1940

2,193,134

UNITED STATES PATENT OFFICE 2,193,134

HOOD LATCH

Dibrell P. Hynes, Evanston, Ill., assignor to Chicago Forging & Manufacturing Company, Chicago, Ill., a corporation of Illinois Original application July 11, 1938, Serial No. 220,657. Divided and this application December 24, 1938, Serial No. 247,666

4 Claims. (Cl. 292—214)

The present invention relates to improvements in automobile hood latches and is a division of my co-pending application Serial No. 220,657, filed in the United States Patent Office on the 11th day of July, 1938.

One purpose is the provision of an improved latching means which is adaptable for use in connection with top panel front opening automobile hoods wherein the panel is pivoted at the rear and opens from the front. It is, however, capable of other applications.

Another purpose is the provision of handle control means whereby, when the handle reaches one of its limits of movement, it is normally returned in a rearward direction a predetermined distance when released.

Other objects will appear from time to time in the course of the specification and claims.

I illustrate my invention more or less diagrammatically in the accompanying drawings wherein:

Fig. 1 is a side elevation in part section of the front end of an automobile using my latch;

Fig. 2 is a detail view of the inner side of the hand controlled portion of the hood latch showing the latch in engaged position;

Fig. 3 is a similar view to Fig. 2 showing the latch in disengaged position;

Fig. 4 is a section along the line 4—4 of Fig. 3; and

Fig. 5 is an enlarged view in part section of the hood latch structure illustrated in Fig. 1.

Like parts are indicated by like characters in the specification and drawings.

Referring to the drawings, 1 is the automobile radiator grill or apron, a part of the body. 2 indicates the vehicle frame. 3 is the top panel or hood, pivoted as at 4, at the rear end. 5 is a hand lever projecting from a lock spindle 6, which spindle extends inwardly through the grill or apron and is rotatably mounted therein. 7 is a bracket assisting in supporting the spindle. 8 is a crank rigidly mounted on the spindle 6. 9 is a connecting rod extending from the lever upwardly inside the grill or apron to the latch.

10 is a stop arm extending from the spindle 6 in a direction opposite to the crank 8. It is adapted to engage an abutment 11, when in the locked position. This abutment is so positioned that the tension on the rod 9 holds the lug 10 against the abutment 11 in locked position. 12 is a spring in the path of the lug 10. 13 is an abutment which limits the movement of the crank in the unlocking position.

When the lever 5 is manipulated to rotate the crank 8 in a clockwise direction, referring to the parts as illustrated in Figs. 2 and 3, the part 10 unseats from the abutment 11, the crank moves to the left, and the connecting rod 9 is forced upwardly. This continues until the lug 10 engages the spring 12. Further movement of the lug 10, by manipulation of the crank 8 by engagement with the lever 5, causes the lug 10 to compress the spring 12, and when the lug 10 and spring 12 are against the abutment 13, the spring 12 will remain in compressed position.

When the lug 10 rests against the abutment 13, the hood latch controlled by the handle 5 is in the completely open position, both the automatic safety latch and the main positive latch being free. The spring 12, however, as soon as the operator releases the handle 5, raises the lug 10 off the abutment 13 and moves the parts into the position where the automatic safety catch is permitted to return to the locking position without any effect whatever upon the main positive hood latch.

15 is a bracket upon which the hood latch itself is mounted. Upon this bracket is pivoted the safety latch hook 16, adapted to engage with a safety latch abutment 17, supported on a frame 17a depending from the hood. The hook has a cam surface 18 adapted to be engaged by the underside of the abutment 17 as it comes down to rotate the hook to the left to permit the abutment to pass below the end of the hook. 19 is a spring which permits the hook to yield and snaps it back into position above the abutment 17.

In closed position the abutment 17 is located a few inches below the hook. The abutment 17 and the abutment engaging portion 20 are inclined so as to provide a positive hook action so that if the hood latch is not otherwise fastened and blows open, the abutment 17 and the surface 20 on the hook interlock, positively preventing opening beyond a predetermined point.

Pivoted on the bracket 15 is a positive hood latch crank 25, supported in bearings 26 on a frame 26a, which projects upwardly from the vehicle frame. The offset central portion 27 of this crank, located between the bearings 26, is engaged by an eyelet 28, on the upper end of the connecting rod 9, so that manipulation of the handle 5 causes rotation of the crank. The two ends of the latch crank are offset as at 28a, to engage positive lock abutments 29, adjacent each side of the vehicle hood on the bracket 31, and when the handle is in the locking position, the latch crank normally engages at both ends with the abutments on the hood and holds it in closed or seated position.

When the handle is in the full open position, with the lug 10 against the stop 13, the eyelet 28, which engages the cam surface 30 on the automatic safety hook 16, moves up to swing the hook in a counter-clockwise direction, throwing it out of line with the abutment 17, so that the hood can be opened. But as soon as the operator releases his hold on the handle, the spring 12 rotates the lever sufficiently to allow the eyelet 28 to come down and permit the spring 19 to move the automatic latch hook into the operative position.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative and diagrammatic, rather than as limiting me to my precise showing.

I claim:

1. A control means for hood latches and the like, including a handle, a rotatably mounted spindle rigidly connected thereto, a connecting rod, spaced abutments adapted to constrict the rotation of the handle between angular limits, and yielding means, adapted to be compressed when the handle reaches one of its limits, and to normally return the handle a part of its angular excursion from such limit when the handle is released.

2. Control means for hood latches and the like comprising a rotatably mounted spindle, a handle and a lever both rigidly mounted on the spindle, an extension for the lever on the opposite side of the axis of rotation, two spaced abutments adapted to be engaged by the extension and to limit the angular excursion of the handle, and spring means associated with said lever and adapted, in cooperation with one of said abutments yieldingly to disengage the extension from such abutment and to return it toward the opposite handle position when the handle is released.

3. Control means for hood latches and the like including a rotatably mounted member, a handle and a lever both rigid in relation to said member, an extension for the lever on the opposite side of the axis of rotation, means for limiting said extension to a predetermined arc of movement and for thereby limiting the angular excursion of the handle, and means for normally urging said lever extension to an intermediate position in relation to its arc of movement.

4. For use with an automobile hood and body, having a hood latch interposed between hood and body, control means for the hood latch including a rotatable member mounted on and adjacent the front of the body, an exterior handle movable therewith, latch means intermediate hood and body, an actuating connection between the rotatable member and latch means, and means normally effective to urge said handle to an intermediate position in relation to the normal path of movement involved in its opening or closing excursion.

DIBRELL P. HYNES.